(12) United States Patent
Aou et al.

(10) Patent No.: US 9,657,118 B2
(45) Date of Patent: May 23, 2017

(54) TOUGHENING AGENT FOR EPOXY THERMOSET

(71) Applicants: Kaoru Aou, Lake Jackson, TX (US); Rajat Duggal, Pearland, TX (US); Marvin L. Dettloff, Lake Jackson, TX (US); Theofanis Theofanous, Lake Jackson, TX (US); Eddy Garcia-Meitin, Angleton, TX (US); Nikhil Verghese, Lake Jackson, TX (US)

(72) Inventors: Kaoru Aou, Lake Jackson, TX (US); Rajat Duggal, Pearland, TX (US); Marvin L. Dettloff, Lake Jackson, TX (US); Theofanis Theofanous, Lake Jackson, TX (US); Eddy Garcia-Meitin, Angleton, TX (US); Nikhil Verghese, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 213 days.

(21) Appl. No.: 14/365,776

(22) PCT Filed: Dec. 19, 2012

(86) PCT No.: PCT/US2012/070663
§ 371 (c)(1),
(2) Date: Jun. 16, 2014

(87) PCT Pub. No.: WO2013/096474
PCT Pub. Date: Jun. 27, 2013

(65) Prior Publication Data
US 2014/0357802 A1  Dec. 4, 2014

Related U.S. Application Data

(60) Provisional application No. 61/577,791, filed on Dec. 20, 2011.

(51) Int. Cl.
| | | |
|---|---|---|
| *C08F 36/06* | (2006.01) | |
| *C08G 59/18* | (2006.01) | |
| *C08G 59/50* | (2006.01) | |
| *C08L 63/00* | (2006.01) | |

(52) U.S. Cl.
CPC .......... *C08F 36/06* (2013.01); *C08G 59/184* (2013.01); *C08G 59/502* (2013.01); *C08L 63/00* (2013.01)

(58) Field of Classification Search
CPC ...................................... C08F 36/06
See application file for complete search history.

(56) References Cited

U.S. PATENT DOCUMENTS

| | | | |
|---|---|---|---|
| 4,316,003 A | 2/1982 | Dante et al. | |
| 5,750,595 A * | 5/1998 | Arora | C08G 59/066 523/404 |
| 6,077,884 A | 6/2000 | Hess et al. | |
| 7,750,094 B2 | 7/2010 | Burns et al. | |
| 8,951,619 B2 * | 2/2015 | Wilmot | C08G 59/18 138/145 |
| 9,006,385 B2 * | 4/2015 | Wilmot | C08G 59/066 528/403 |
| 2003/0196753 A1 | 10/2003 | Schoenfeld et al. | |
| 2004/0063901 A1 * | 4/2004 | Back | C08G 73/028 528/407 |
| 2009/0099312 A1 | 4/2009 | Weber et al. | |
| 2010/0234516 A1 | 9/2010 | Burns et al. | |
| 2010/0285309 A1 * | 11/2010 | Barriau | C08G 59/066 428/336 |
| 2015/0307651 A1 * | 10/2015 | Chang | C08G 59/066 525/380 |

FOREIGN PATENT DOCUMENTS

| | | |
|---|---|---|
| WO | 2009036790 | 3/2009 |

OTHER PUBLICATIONS

International Search Report and Written Opinion for related PCT Application PCT/US2012/070663, mailed Mar. 1, 2013 (9 pgs).

* cited by examiner

*Primary Examiner* — Megan McCulley
(74) *Attorney, Agent, or Firm* — Brooks, Cameron & Huebsch, PLLC

(57) ABSTRACT

An epoxy thermoset that includes a reaction product of a toughening agent prepared from a reaction of a first epoxy resin and a polyether polyamine, a second epoxy resin and a liquid amine hardener for the toughening agent and the second epoxy resin. The toughening agent is an adduct of the second epoxy resin and the polyether polyamine. The polyether polyamine phase of the toughening agent separates to form particles in the epoxy thermoset, where the particles have a volume average diameter in a range from 20 nanometers to 200 nanometers.

10 Claims, 3 Drawing Sheets

TOUGHENING AGENT FOR EPOXY THERMOSET

This application is a National Stage Application under 35 U.S.C. §371 of International Application Number PCT/US2012/070663, filed Dec. 19, 2012 and published as WO 2013/096474 on Jun. 27, 2013, which claims the benefit to U.S. Provisional Application 61/577,791, filed Dec. 20, 2011, the entire contents of which are incorporated herein by reference in its entirety.

FIELD OF DISCLOSURE

The present disclosure relates to an epoxy thermoset and more particularly to a toughening agent for an epoxy thermoset.

BACKGROUND

Epoxy compositions are formed, at a minimum, from an epoxy resin and a hardener. The epoxy resin can include one or more epoxide groups, while the hardener can include a variety of structures that react with the epoxide group. These two components chemically react, or "cure," to form a cured epoxy product. Upon curing, the epoxy composition forms a highly cross-linked thermoset.

Cured epoxy compositions can have a variety of properties. These properties can depend upon the choice of epoxy resin, hardener, ratio of components, reaction conditions and additives, if any, present in the epoxy composition. An example of one such additive is a liquid toughener, which can be added to the epoxy composition in order to improve the toughness of the cured epoxy composition. One of the most common liquid tougheners is carboxyl-terminated butadiene-acrylonitrile copolymer (CTBN) adducted with bisphenol A diglycidyl ether. Some shortcomings of the CTBN adduct, however, include its very high liquid viscosity and its immiscibility in liquid epoxy resin. The immiscibility, in turn, lead to the cured epoxy resin being opaque due to the formation of large CTBN particles in the cured epoxy composition.

A need therefore remains for a toughening agent for epoxy compositions that is both low in viscosity and that will not adversely affect the optical properties of the cured epoxy composition.

SUMMARY

The present disclosure provides for a toughening agent for an epoxy thermoset that neither increase the liquid viscosity of the epoxy composition nor adversely affects the optical properties of the cured epoxy thermoset.

The epoxy thermoset of the present disclosure is the reaction product of a toughening agent prepared from a reaction of a first epoxy resin and a polyether polyamine, a second epoxy resin and a liquid amine hardener for the toughening agent and the second epoxy resin. The toughening agent is an adduct of the second epoxy resin and the polyether polyamine. The polyether polyamine phase of the toughening agent separates to form particles in the epoxy thermoset, where the particles have a volume average diameter in a range from 20 nanometers to 200 nanometers.

In one embodiment, the first epoxy resin and the second epoxy resin are each at least one or more of the formula:

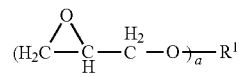

wherein R' is a six carbon atom (C6) to C18 substituted or unsubstituted aromatic, a C1 to C8 aliphatic or cycloaliphatic; or heterocyclic polyvalent group and a has an average value of from 2 to 8. Alternatively, the first epoxy resin and the second epoxy resin are each at least one or more of the formula:

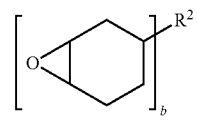

wherein $R^2$ is C6 to C18 substituted or unsubstituted aromatic, a C1 to C8 aliphatic, or cycloaliphatic; or heterocyclic polyvalent group and b has an average value of from 2 to 8.

In one embodiment, the liquid amine hardener is isophorone diamine and the first epoxy resin and the second epoxy resin are each a bisphenol A diglycidyl ether.

The present disclosure further includes a structure having a surface and the epoxy thermoset discussed herein on the surface of the structure.

The present disclosure also includes a method of curing the epoxy thermoset by supplying the toughening agent prepared from the reaction of the first epoxy resin and the polyether polyamine; mixing the toughening agent with the second epoxy resin and the liquid amine hardener; phase separating at least a portion of the toughening agent into particles having a volume average diameter in a range from 20 nm to 200 nm in the second epoxy resin and the liquid amine hardener; and curing the second epoxy resin and the liquid amine hardener, where the particles form a soft dispersed phase and the second epoxy resin and the liquid amine hardener form a hard continuous phase, relative the soft dispersed phase, of the epoxy thermoset.

DETAILED DESCRIPTION

Figure 1:
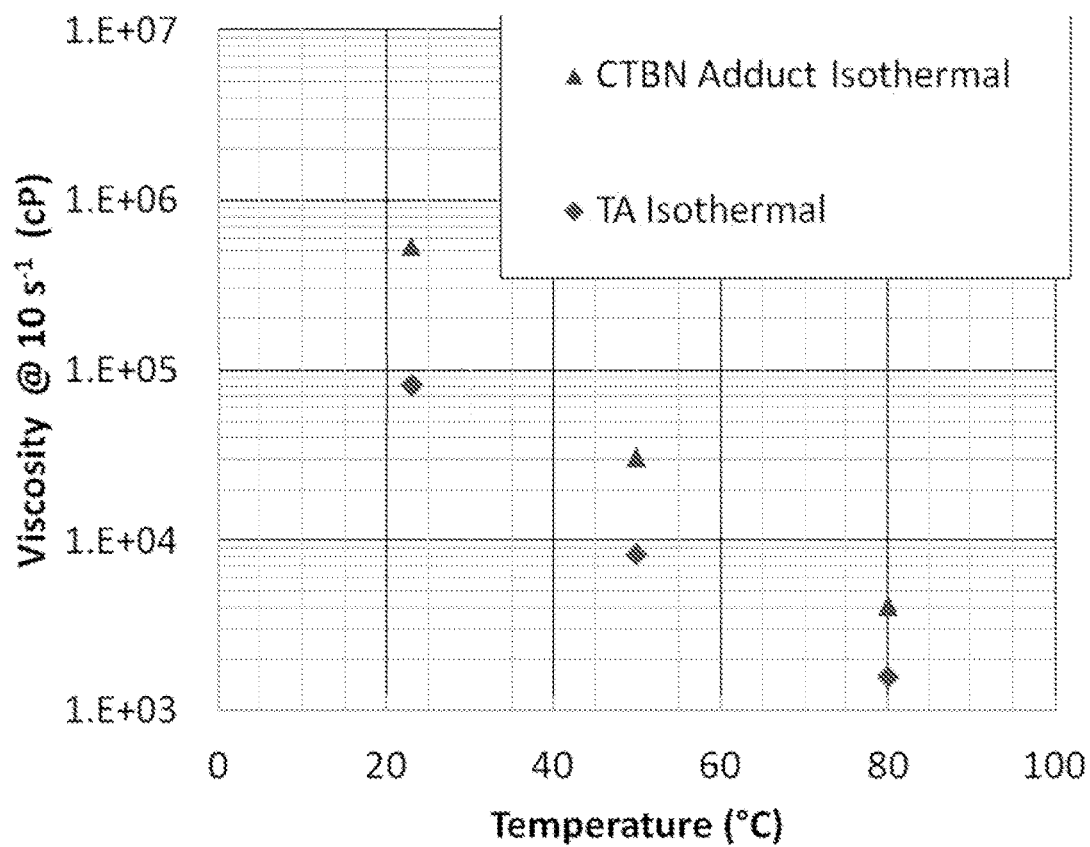
FIG. 1 provides viscosity measurements at isothermal temperatures for a carboxyl-terminated butadiene-acrylonitrile copolymer adduct and an embodiment of a toughening agent of the present disclosure.

The present disclosure provides a toughening agent prepared from a reaction of a polyether polyamine adducted with a molar excess of a first epoxy resin. The toughening agent is formed as an adduct, where the first epoxy resin end-caps the toughening agent. In other words, the reaction of the polyether polyamine and the molar excess of the first epoxy resin produces an epoxy-terminated adduct referred to herein as the toughening agent.

The toughening agent is initially miscible, when admixed, with both a second epoxy resin and a liquid amine hardener. As the epoxy thermoset cures, the polyether polyamine forms particles that are finely dispersed in the resulting cured epoxy thermoset. Specifically, the polyether polyamine of the toughening agent phase separates, due at least in part to its number average molecular weight, in the curing epoxy thermoset to form particles in the epoxy thermoset. The particles can have a volume average diameter in a range from 20 nanometers (nm) to 200 nm. Volume average diameter measured as described in Examples section herein.

The epoxy thermoset of the present disclosure is the reaction product of the toughening agent, prepared from the reaction of the first epoxy resin and the polyether polyamine; the second epoxy resin; and the liquid amine hardener that reacts with both the toughening agent and the second epoxy resin. Preferably, the toughening agent is a liquid at a temperature in a range from 10° C. to less than 50° C. Similarly, it is desirable that the second epoxy resin and the liquid amine hardener, in addition to the toughening agent, are each a liquid at a temperature in a range from 10° C. to less than 50° C. By liquid, it is meant that the material is pourable and/or pumpable at a temperature in a range from 10° C. to less than 50° C.

The reaction product of the epoxy thermoset includes particles, formed from the polyether polyamine, that form a soft dispersed phase as compared to a hard continuous phase formed from the reaction of the liquid amine hardener, the second epoxy resin and the epoxy groups that terminate the toughening agent.

The toughening agent of the present disclosure is formed from the reaction of a polyether polyamine with a first epoxy resin. In preparing the toughening agent the first epoxy resin is in a molar excess relative the polyether polyamine, as discussed herein. A molar excess of epoxy groups from the first epoxy resin relative the amine groups from the polyether polyamine is used to ensure that each amine group reacts with an epoxy group.

As discussed herein, the number average molecular weight of the polyether polyamine, along with its compositional structure, used in the toughening agent helps in the formation of the particles in the epoxy composition of the present disclosure. Specifically, the polyether polyamine has a number average molecular weight in a range from 4,500 to 20,000. Preferably, the polyether polyamine has a number average molecular weight in a range of 4,500 to 10,000. All individual values and subranges of the number average molecular weight from 4,500 to 20,000 are included; for example, the number average molecular weight can be from a lower limit of 4,500, 5,000 or 6,000 to an upper limit of 9,000, 10,000 or 20,000. Specific examples include a number average molecular weight in a range from 4,500 to 9,000; 5,000 to 9,000; 5,000 to 10,000; 5,000 to 20,000; 6,000 to 9,000; 6,000 to 10,000; and 6,000 to 20,000. It is also possible that the polyether polyamine of the present disclosure has a number average molecular weight of greater than 20,000. As used herein, number average molecular weight can be measured by gel permeation chromatography.

The polyether polyols for producing the polyether polyamine are generally obtained by addition of a two carbon atom (C2) to C8 alkylene oxide to an initiator having a nominal functionality of 2 to 6 (that is, having 2 to 6 active hydrogen atoms). In further embodiments, the alkylene oxide contains C2 to C4 such as ethylene oxide, propylene oxide, butylene oxide and mixtures thereof. When two or more oxides are used, they may be present as random mixtures or as blocks of one or the other polyether. Preferably, the polyether polyol is liquid at a temperature in a range from 10° C. to less than 50° C. In a further embodiment the ethylene oxide content of the polyether polyol is less than 30, is less than 25, is less than 20 or is less than 15 weight percent ethylene oxide based on the total weight of the polyether polyol. In one embodiment the polyether polyol is a poly(oxypropylene)polyol.

A variety of catalysts and initiators can be used in forming the polyether polyols from the alkylene oxide. Examples of such catalysts include, but are not limited to, potassium hydroxide, caesium hydroxide, boron trifluoride, a double cyanide complex catalyst such as zinc hexacyanocobaltate or quaternary phosphazenium compound, among others. Examples of initiators include glycerin, trimethylol propane, sucrose, sorbitol, pentaerythritol, ethylene diamine and aminoalcohols, such as, ethanolamine, diethanolamine, and triethanolamine. In a further embodiment the initiator for the polyether contains from 3 to 4 active hydrogen atoms. In a further embodiment, the initiator is a polyhydric initiator.

The polyols can have an equivalent weight of at least 500 and preferably at least 750 up to 1,500 or up to 2,000. In one embodiment, polyether polyols having a number average molecular weight of 4,500 and above, based on trihydric initiators can be used.

The conversion of the polyether polyol to a polyether polyamine is known in the art. An example of such a conversion, by reductive amination, can be found in U.S. Pat. No. 3,654,370, the contents of which are incorporated by reference.

Polyether polyamines may be represented by the general formula

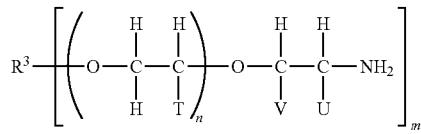

wherein $R^3$ is the nucleus of an oxyalkylation-susceptible initiator containing 2-12 carbon atoms and 2 to 8 active hydrogen groups, U, T and V are independently hydrogen or an alkyl group containing 1-4 carbon atoms, n is number selected to provide a polyol having a number average molecular weight of as described herein and m is an integer of 2 to 8 corresponding to the number of active hydrogen groups originally present in the initiator. In one embodiment, n will have a value of 35 to 100. In a further embodiment $R^3$ has 2 to 6 or 2 to 4 active hydrogen groups. In another embodiment, the active hydrogen groups are hydroxyl groups. In another embodiment, $R^3$ is an aliphatic polyhydric initiator. In a further embodiment, $R^3$ has 3 active hydrogen groups. In further embodiments, n will be less than 90, less than 80, less than 75, or less than 65. In a further embodiment U, T and V are each methyl.

Based on the number average molecular weight of the polyol, the polyether polyamine of the present disclosure can have an amine equivalent weight of from 900 to 4,000. In a further embodiment the amine equivalent weight will be less than 3,000. In the practice, a single number average molecular weight polyether polyamine may be used. Also, mixtures of different polyether polyamines, such as mixtures of tri- and higher functional materials and/or different molecular weight or different chemical composition materials, may be used. Amine equivalent weight can be measured according to ASTM D1652.

In one embodiment, the polyether polyamine includes at least three primary amines (e.g., when m is 3 to 8) where each primary amine has at least one reactive hydrogen atom reactive with the epoxide group of the first epoxy resin. An example of a commercially available polyether polyamine like this includes, but is not limited to, JEFFAMINE™ T-5000 from Huntsman Corporation. In one embodiment, the polyether polyamine of the present disclosure is JEFFAMINE™ T-5000.

The first epoxy resin used in forming the toughening agent and the second epoxy resin can each be a polyepoxide compound containing at least two epoxy groups. The first epoxy resin and the second epoxy resin can each be saturated or unsaturated, aliphatic, cycloaliphatic, aromatic or heterocyclic and may be substituted. The first epoxy resin and the second epoxy resin can each be monomeric or polymeric.

In one embodiment, the first epoxy resin and the second epoxy resin can each be a diepoxide. Diepoxide as used herein refers to an epoxide compound or mixture of epoxide compounds wherein at least one of the compounds contains two epoxy groups. The first epoxy resin and the second epoxy resin are each a liquid at a temperature in a range from 10° C. to less than 50° C.

In one embodiment the first epoxy resin and the second epoxy resin can each be represented by the formula:

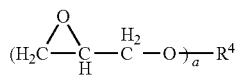

wherein $R^4$ is a C6 to C18 substituted or unsubstituted aromatic, a C1 to C8 aliphatic, or cycloaliphatic; or heterocyclic polyvalent group and a has an average value of from 2 to 8.

Aliphatic forms of the first epoxy resin and the second epoxy resin can each be prepared from known reactions of epihalohydrins and polyglycols. Examples of aliphatic forms of the first epoxy resin include trimethylpropane epoxide, and diglycidyl-1,2-cyclohexane dicarboxylate.

Other examples of the first epoxy resin and the second epoxy resin can include, for example, the glycidyl ethers of polyhydric phenols or epoxy resins prepared from an epihalohydrin and a phenol or a phenol type compound. The phenol type compound includes compounds having an average of more than one aromatic hydroxyl group per molecule. Examples of phenol type compounds include dihydroxy phenols, biphenols, bisphenols, halogenated biphenols, halogenated bisphenols, hydrogenated bisphenols, alkylated bisphenols, trisphenols, phenol-aldehyde resins, novolac resins (i.e. the reaction product of phenols and simple aldehydes, preferably formaldehyde), halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof.

Additional examples of the first epoxy resin and the second epoxy resin can include the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or a combination thereof. In one embodiment, the first epoxy resin and the second epoxy resin are each a bisphenol A diglycidyl ether.

Examples of bisphenol A based epoxy resins useful as the first epoxy resin and the second epoxy resin can include commercially available epoxy resins such as D.E.R.™ 300 series (e.g., D.E.R.™ 383) and D.E.R.™ 600 series, commercially available from The Dow Chemical Company. Examples of epoxy novolac resins useful as the first epoxy resin and the second epoxy resin can include commercially available resins such as D.E.N.™ 400 series, commercially available from The Dow Chemical Company.

In a further embodiment, the first epoxy resin and the second epoxy resin can each be an epoxy resin from an epihalohydrin and resorcinol, catechol, hydroquinone, biphenol, bisphenol A, bisphenol AP (1,1-bis(4-hydroxyphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins, tetramethylbiphenol, tetramethyl-tetrabromobiphenol, tetramethyltribromobiphenol, tetrachlorobisphenol A, or combinations thereof.

In another embodiment, the first epoxy resin and the second epoxy resin can each include those resins produced from an epihalohydrin and an amine. Suitable amines include diaminodiphenylmethane, aminophenol, xylene diamine, anilines, and the like, or combinations thereof.

The first epoxy resin and the second epoxy resin can each be produced from an epihalohydrin and a carboxylic acid. Suitable carboxylic acids include phthalic acid, isophthalic acid, terephthalic acid, tetrahydro- and/or hexahydrophthalic acid, endomethylenetetrahydrophthalic acid, isophthalic acid, methylhexahydrophthalic acid, and the like or combinations thereof.

Other useful epoxide compounds for the first epoxy resin and the second epoxy resin can include cycloaliphatic epoxides. A cycloaliphatic epoxide consists of a saturated carbon ring having an epoxy oxygen bonded to two vicinal atoms in the carbon ring for example as illustrated by the following general formula:

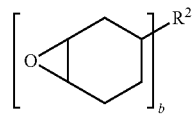

wherein $R^2$ is C6 to C18 substituted or unsubstituted aromatic, a C1 to C8 aliphatic, or cycloaliphatic; or heterocyclic polyvalent group and b has an average value of from 2 to 8.

The cycloaliphatic epoxide may be a diepoxide, a polyepoxide, or a mixture of those. For example, the cycloaliphatic epoxides described in U.S. Pat. No. 3,686,359, incorporated herein by reference, may be used in the present disclosure. As an illustration, the cycloaliphatic epoxides that may be used in the present disclosure include, for example, 3,4-epoxy-cyclohexyl-methyl 3,4-epoxy-cyclohexyl carboxylate (available as ERL-4221 from Polysciences, Inc; CAS registry number 2386-87-0), bis-(3,4-epoxycyclohexyl) adipate, vinylcyclohexene monoxide (CAS registry number 29087-40-9) and mixtures thereof.

Another class of epoxy resins useful for the first epoxy resin and the second epoxy resin can include those based on divinylarene oxide product illustrated generally by general chemical Structures I-IV as follows:

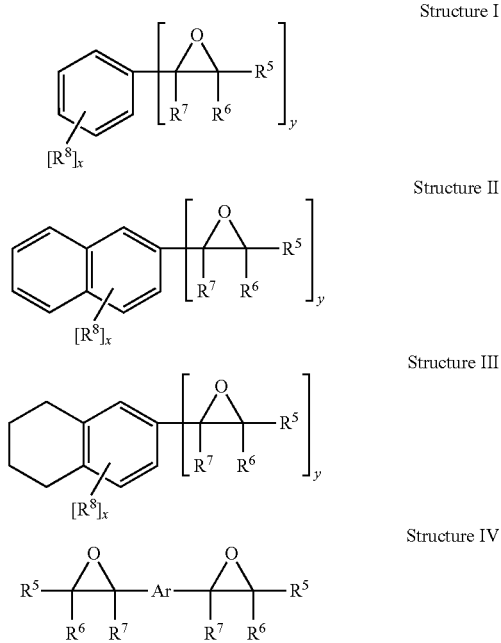

Structure I

Structure II

Structure III

Structure IV

In the above Structures I, II, III and IV of the divinylarene dioxide product of the present disclosure, each $R^5$, $R^6$, $R^7$ and $R^8$ individually may be hydrogen, an alkyl, cycloalkyl, an aryl or an aralkyl group; or an oxidant-resistant group including for example a halogen, a nitro, an isocyanate, or an RO group, wherein R may be an alkyl, aryl or an alkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group.

In certain embodiments of the divinylarene dioxide products the alkyl moiety will have from 1 to 36 carbon atoms. In further embodiments the alkyl will have less than 24, or less than 18 carbon atoms. In further embodiments the alkyl will have from 1 to 8 or from 1 to 6 carbon atoms. Similarly the cycloalkyl will contain from 5 to 36 carbon atoms. Generally the cycloalkyl will contain from 5 to 24 carbon atoms.

The aryl moiety present in the divinylarene dioxide will generally contain 12 carbon atoms or less. An aralkyl group will generally contain 6 to 20 carbon atoms.

The divinylarene dioxide product produced by the process of the present disclosure may include for example alkylvinyl-arene monoxides depending on the presence of alkylvinylarene in the starting material.

In one embodiment of the present disclosure, the divinylarene dioxide produced by the process of the present disclosure may include for example divinylbenzene dioxide, divinylnaphthalene dioxide, divinylbiphenyl dioxide, divinyldiphenylether dioxide, and mixtures thereof.

Optionally, the first epoxy resin and the second epoxy resin may each also contain a halogenated or halogen-containing epoxy resin compound. Halogen-containing epoxy resins are compounds containing at least one epoxy group and at least one halogen. The halogen can be, for example, chlorine or bromine. Examples of halogen-containing epoxy resins useful in the present disclosure include diglycidyl ether of tetrabromobisphenol A and derivatives thereof. Examples of the epoxy resin useful in the present disclosure include commercially available resins such as D.E.R.™ 500 series, commercially available from The Dow Chemical Company.

Each of the first epoxy resin and the second epoxy resin has an epoxide equivalent weight in a range of from 150 to 370. All individual values and subranges of the epoxide equivalent weight from 150 to 370 are included; for example, the epoxide equivalent weight can be from a lower limit of 155, 160, 165 or 170 to an upper limit of 270, 300 or 335. Specific examples include an epoxide equivalent weight in a range from 155 to 335, 160 to 335, 165 to 300, and 170 to 270.

The epoxide equivalent weight of the first epoxy resin and/or the second epoxy resin is generally from 100 to 8000 and more preferably from 100 to 4000. As used herein the terms "epoxide equivalent weight" ("EEW") refers to the average molecular weight of the polyepoxide molecule divided by the average number of oxirane groups present in the molecule. The diepoxides useful in the present disclosure are the epoxy resins having an EEW of from 100 to 500.

As discussed herein, in preparing the toughening agent the first epoxy resin is in a molar excess relative the polyether polyamine. The molar amount of the first epoxy resin relative the polyether polyamine used in forming the toughening agent can be varied over a wide range. Generally the first epoxy resin used should be at present in a ratio of at least 3 epoxy groups per amine hydrogen atom to avoid prepolymer gelling. In further embodiments the ratio of the epoxy group per amine hydrogen atom is at least 5 to 1, at least 10 to 1 and generally up to 20 to 1. A higher ratio of the epoxy group per amine hydrogen atom has the benefit of lowering the toughening agent viscosity.

Reaction temperatures for the polyether polyamine and the first epoxy resin can be in a range from 70° C. to 150° C. for a time sufficient to react the reactive hydrogen atoms available. As both the polyether polyamine and the first epoxy resin are liquid in a temperature range of from 10° C. to below 50° C., no solvent is needed during the reaction. In one embodiment, the toughening agent formed by reacting no less than 5 moles of polyepoxide resin per mole of diamine at temperatures in the range of about 115° C. for not less than 4 hours with constant stirring. Exact temperatures and duration can depend on the reactivity of the polyepoxide resins being utilized.

Optionally the reaction may be carried out in the presence of conventional catalysts that promote the reaction between amines and epoxides. A catalyst can be used to help promote the formation of the toughening agent. Examples of such catalysts include, but are not limited to, phosphines, amines, phosphonium salts, ammonium salts, or the like. Optionally the reaction may be carried out in the presence of solvents suitable for dissolving the amine and/or epoxy.

As discussed herein, the epoxy thermoset of the present disclosure is the reaction product of the toughening agent (prepared from the reaction of the first epoxy resin and the polyether polyamine), a second epoxy resin and a liquid amine hardener, where the liquid amine hardener reacts with both the epoxy groups on the toughening agent and the second epoxy resin. For the various embodiments, the first epoxy resin and the second epoxy resin are chemically identical. In other words, the first epoxy resin is compositionally identical to the second epoxy resin. As such, the second epoxy resin can each be one or more of the epoxy resins provided herein for the first epoxy resin. In other words, the list of epoxy resins for the first epoxy resin herein is also the list for the second epoxy resin of the epoxy thermoset.

It is appreciated that while the first epoxy resin and the second epoxy resin can be chemically identical, it is also possible that the second epoxy resin can be chemically different than the first epoxy resin. Even though the second epoxy resin may be chemically different than the first epoxy resin, the second epoxy resin can still be selected from the group of epoxy resins provided herein.

The toughening agent and the second epoxy resin react with the liquid amine hardener to form the epoxy thermoset of the present disclosure. The liquid amine hardener can be a polyamine having an epoxy equivalent weight of less than 200 and having 2 to 5 active hydrogen atoms. Generally the liquid amine hardener has an equivalent weight of at least 20. The amino equivalent weight means the molecular weight of the liquid amine hardener divided by the number of amine active hydrogen atoms. In a further embodiment, the liquid amine hardener has from 2 to 4 active hydrogen atoms. In yet another embodiment, the liquid amine hardener has 4 active hydrogen atoms.

The curing of the epoxy thermoset is generally done at a temperature higher than the temperature range of from 10° C. to below 50° C. As is it generally desirable to have a short curing time when making articles, the liquid amine hardener is selected to give a curing time (demold) of less than 30 minutes when the molds are heated at approximately 100° C. In a further embodiment, the curing time is less than 20 minutes. In a further embodiment the curing time is less than 15 minutes. The liquid amine hardener is generally added to provide 0.8 to 1.5 amine equivalents (NH) per epoxy reactive group. In a further embodiment the ratio is from 0.9 to 1.1.

Examples of suitable liquid amine hardeners for use in the present disclosure include those represented by the following formula:

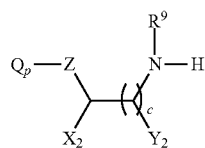

wherein $R^9$, Q, X, and Y at each occurrence are independently H, a C1-C14 aliphatic, a C3-C10 cycloaliphatic, or C6-C14 aromatic or X and Y can link to form a cyclic structure; Z is O, C, S, N, or P; and c is 1 to 8: p is 1 to 3 depending on the valence of Z. In one embodiment Z is oxygen. In a further embodiment Z is oxygen and $R^9$ is hydrogen. In another embodiment X and Y are both hydrogen.

Cyclic diamine as represented by the following formula may also be used as the liquid amine hardener in the present disclosure:

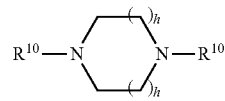

wherein $R^{10}$ at each occurrence is independently H or $-CH_2CH_2NH_2$ and h is 0-2 with the proviso that both h's cannot be 0.

Aromatic amine curing agents may also be used such as toluene-2,4-diamine; toluene-2,6-diamine, isomers of phenylene diamine; aniline; and the like. In another embodiment the amine curing agent can be the steric and geometric isomers of isophorone diamine, cyclohexane-diyldimethanamine, or cyclohexane diamine.

Examples of specific liquid amine hardeners include: isophorone diamine; piperazine; homopiperazine; butylamine; ethylene diamine; hexamethylene diamine; and mixtures thereof.

In one embodiment the liquid amine hardener is isophorone diamine and the first epoxy resin and the second epoxy resin are each a bisphenol A diglycidyl ether.

If desired, other additives which may be used with the epoxy thermoset of the present disclosure include flame retarding agents, plasticizers, antioxidants, UV stabilizers, adhesion promoters, dyes, pigments, fillers, and reinforcing agents. For example, for modifying the thermal conductivity, fillers such as glass hollow spheres may be added. If desired, viscosity modifying agents known in the art may be added. Examples of such additives include diglycidyl ether of butane diol, glycidyl ethers of fatty acid or natural oils or TEP (triethyl phosphate, $(C_2H_5)_3PO_4$).

During the cure of the epoxy composition the toughening agent of the present disclosure forms particles that are dispersed throughout a matrix formed by the second epoxy resin and the liquid amine hardener. Compared to the matrix, which is a hard continuous phase, the particles provide a soft dispersed phase that makes them very useful for toughening the epoxy composition. The toughening agent also has a number average molecular weight, as provided herein, that helps to promote the phase separation of the particles from the matrix. The tendency is for improved phase separation of the particles as the number average molecular weight of the toughening agent increases. This finding has been surprising as conventional wisdom suggested that polyether polyamines (such as Jeffamine® T-5000 from Huntsman) would be too compatible with liquid epoxy resins, and thus would not phase separate but rather act as a plasticizing material.

The particles also have a size and a distribution that does not adversely affect the optical properties of the cured epoxy thermoset. For the various embodiments, the toughening agent is initially fully miscible, when admixed, with both the second epoxy resin and the liquid amine hardener. As the epoxy thermoset cures, the particles, formed from the polyether polyamine, phase separate from the matrix resulting in the particles being dispersed in the resulting cured epoxy thermoset. The particles have a volume average diameter in a range from 20 nanometers (nm) to 200 nm. In one embodiment, the particles have a volume average diameter in a range from 20 nm to 120 nm. In both cases, the volume average diameter of the particles is below the spectrum of visible light (i.e., 390 mm to 750 nm). As such, the particles are not likely to adversely affect the optical properties of the cured epoxy thermoset. Measuring the volume average diameter of the particles can be accomplished in a variety of ways, including by laser diffraction or Low Angle Laser Light Scattering.

The toughening agent also does not adversely affect the viscosity of the epoxy thermoset upon the initial mixing of the components. Specifically, the toughening agent of the present disclosure can have a viscosity in a range of 20,000 centipoises (cP) to 150,000 cP measured isothermally at 23° C. after 300 seconds on a TA Instruments AR2000 at a shear rate of 10 s$^{-1}$ with a steel parallel plate geometry having a gap of 800 microns and a plate diameter of 50 mm. Isothermal viscosity measurements were taken after 300 seconds at the specified temperatures. For FIG. 1, these were 23° C., 50° C., and 80° C.

The method of curing the epoxy thermoset of the present disclosure includes supplying the toughening agent, as discussed herein, prepared from the reaction of the first epoxy resin and the polyether polyamine, and mixing the toughening agent with the second epoxy resin and the liquid amine hardener. As the reaction progresses, at least a portion of the toughening agent phase separates (e.g., the polyether polyamine) into particles having a volume average diameter in a range from 20 nm to 200 nm in the second epoxy resin and the liquid amine hardener. The second epoxy resin and the liquid amine hardener cure to form the matrix, while the particles form a soft dispersed phase in the matrix. For the various embodiments, the matrix formed from the second epoxy resin and the liquid amine hardener provides a hard continuous phase, relative the soft dispersed phase, of the epoxy thermoset.

The reaction preferably is carried according to a heating schedule that allows for the particles to phase separate from the matrix during the curing of the epoxy composition. Specifically, the particles begin to form in the mixture at a first temperature over a first time interval. The first temperature used in forming the particles can be the onset temperature of the reaction exotherm peak for the reaction of the first epoxy resin and the liquid amine hardener, the value of which can be determined by a differential scanning calorimetry. Specifically, the onset temperature of the exotherm (understood to mean that which is measured during a heating cycle from around room temperature, with a typical heating rate being 10° C./min) is the intersection on the differential scanning calorimetry data between the baseline before the exothermic peak and the tangent to the first inflection point of the exothermic peak. The first time interval can be determined by the duration of the heating through the reaction exotherm peak used in determining the onset temperature of the reaction exotherm peak.

The first temperature is typically lower than a curing temperature that would be typically used to cure the second epoxy resin and the liquid amine hardener in a different system. Reacting the toughening agent and the liquid amine hardener at the first temperature for the first time interval allows the number average molecular weight of the copolymer of polyetheramine/epoxy resin to increase sufficiently so that the polyether polyamine portion of the toughening agent begins to precipitate from the reaction mixture.

Following the first time interval, the temperature of the mixture can be increased to a curing temperature, where the rest of the amine groups (on both the toughening agent and the liquid amine hardener) can then react with the remaining first and second epoxy resin in the mixture to fully cure the epoxy composition. The curing temperature of the present disclosure can be in a range from 90° C. to 220° C. The epoxy composition can be held at the cure temperature for a time of 0.5 to 8 hours (hrs).

With respect to a formulation for the epoxy composition, the toughening agent can constitute 4 to 30 weight percent of the total weight of the epoxy composition. Preferably, the toughening agent can constitute 5 to 10 weight percent of the total weight of the epoxy composition.

The epoxy composition can be formed using a molar ratio based on the epoxy functional groups of the first and second epoxy resins, combined, to the amine hydrogen atoms of the liquid amine hardener, or the "epoxy-amine molar ratio," in a range of from 0.7:1 to 1.2:1. All individual values and subranges of the epoxy-amine molar ratio from 0.7:1 to 1.2:1 are included; for example, the epoxy-amine molar ratio can be from a lower limit of 0.8:1, 0.85:1, 0.9:1 or 0.95:1 to an upper limit of 1.05:1, 1.1:1 or 1.15:1. In one embodiment, the epoxy-amine molar ratio to the liquid amine hardener is 1:1.

The epoxy composition of the present disclosure can have a glass transition temperature (Tg) in a range from 100° C. to 170° C. All individual values and subranges of the Tg from 100° C. to 170° C. are included; for example, the Tg of the epoxy composition can be from a lower limit of 100° C., 120° C. or 155° C. to an upper limit of 158° C. or 170° C. Specific examples include a Tg in a range from 100° C. to 158° C.; 120° C. to 158° C.; or 155° C. to 158° C. Tg values are measured as described in the Examples section herein.

The epoxy thermoset of the present disclosure can be used with a variety of structures and/or surfaces. For the various embodiments, the epoxy thermoset can be applied as one or more layers to a surface of a structure by known methods in the art. Examples of such methods of applying the epoxy thermoset to the surface of the structure includes, but is not limited to, spraying, brush coating, extrusion, immersion or flooding or by means of rollers or doctor applicators. Examples of such structures can include, but are not limited to, those made of a synthetic polymer, a polymer derived from a natural source, a metal such as an alloy or elemental metal, a wood, a ceramic, concrete, asphalt, a glass and combinations thereof.

The following examples are provided to illustrate the disclosure, but are not intended to limit the scope thereof. All parts and percentages are by weight unless otherwise indicated.

EXAMPLES

Materials

Jeffamine® T-5000 (a polyether polyamine, available from Huntsman)

FORTEGRA™ 201 (a carboxyl-terminated butadiene-acrylonitrile (CTBN) copolymer/epoxy resin adduct, or CTBN adduct, where CTBN is present as 40 wt % of the total adduct; epoxy-equivalent weight is 340 g/mol, available from The Dow Chemical Company).

Isophorone diamine (IPDA, a liquid amine hardener, epoxy-equivalent weight of 42.6 g/mol, available from Evonik).

D.E.R.™ 383 (a liquid epoxy resin, epoxy-equivalent weight of 180 g/mol, available from The Dow Chemical Company).

Tests

Dynamic Mechanical Thermal Analysis (DMTA)

Conduct DMTA tests using an ARES Rheometer from TA Instruments equipped with Orchestrator V7.0.8.23 software and a torsion rectangular fixture. Perform dynamic temperature ramp tests from −100 to 250° C. using a frequency of 1.0 Hz, 0.05% strain (but with variable strain allowed to prevent overload of transducer), a pre-load of 10.0 grams (g), at a ramp rate of 3.0° C./minute). Also, use the following settings: a maximum applied strain of 10.0%, a minimum allowed torque of 0.2 g-cm and a strain adjustment of 30% of current strain. Monitor and control the temperature using a Sample PRT (platinum resistance thermocouple) located near the center of the sample in a forced convection oven. Record the value of tan delta (tangent of the phase lag, equal to the ratio of G"/G' at 25° C. for each sample.

Viscosity Measurements

TA Instruments AR2000 was used to measure viscosity. Shear rate of 10 s$^{-1}$ was used. A steel parallel plate geometry was used, with a gap of 800 microns. Parallel plate diameter was 50 mm. Isothermal viscosity measurement was taken after 300 seconds at a given temperature.

Differential Scanning Calorimetry (DSC)

Use a Model Q2000 differential scanning calorimeter (TA Instruments). Equip the calorimeter with an RCS cooling system and a nitrogen gas purge set at 50 mL/min flow rate for all tests. Calibrate the calorimeter for temperature using the melting points of mercury (−38.83° C.), indium (156.60° C.), and lead (327.50° C.), and for heat flow using the heat of fusion of indium (28.6 J/g). Hermetically seal samples in aluminum pans before measurement. Sample masses vary from 4.5 to 8 mg. Set the heating program so that sample is cooled to −90° C., then ramped at 10° C./min to 120° C. Cool the DSC cell at 3° C./min to −90° C., and repeat the same cycle for a second time. Derive the $T_g$ from the second heating cycle using the inflection point method. Use a Universal Analysis 2000 (version 4.3A) from TA Instruments to perform the analysis. Use the following thermal schedule:

Equilibrate at 20.00° C.
Ramp 10.00° C./min to 250.00° C.
Mark end of cycle 1
Equilibrate at −70.00° C.
Mark end of cycle 2
Ramp 10.00° C./min to 250.00° C.

For DSC measurements where a reaction exotherm was measured, a 12 g mixture was made instead of the 310 g mixture used in all other cases.

TEM Images

Collect images on a JEOL JEM-1230 transmission electron microscope operated at 100 kV accelerating voltage and capture images on a Gatan-791 and 794 digital cameras.

Sample preparation is as follows. Trim cast plaques, discussed herein, so that sections are collected near the core. Cryopolish the trimmed samples prior to staining by removing sections from the blocks at −60° C. to prevent smearing of the elastomer phases. Stain the cryo-polished blocks with the liquid phase of a 2 wt % aqueous osmium tetraoxide solution for 3 hours at ambient temperature (23° C.). Sections of approximately 90 nanometers in thickness were collected from the stained samples at ambient temperature using a diamond knife on a Leica EM UC7 microtome and placed on 400 mesh virgin TEM grids for observation. One of two grids collected for each sample were also post stained with the vapor phase of a 0.5% aqueous ruthenium tetraoxide solution for 10 minutes.

Mechanical Testing

Test fracture toughness ($K_{1C}$) pursuant to ASTM D5045. Test tensile strength pursuant to ASTM D638.

Forming Toughening Agent (TghAgt)

Representative procedure follows: Form the TghAgt as follows. In a 1-liter three-neck flask under a nitrogen environment with mechanical stirrer, add 144 grams (g) (0.8 moles epoxy equiv.) of the liquid epoxy resin D.E.R.™ 383. Stream into the flask 153.3 g (0.16 moles of amine hydrogen atoms) of polyether polyamine (Jeffamine® T-5000). Heat the contents of the flask to 120° C. with stirring. The mix ratio (by weight) is approximately 1:1 volume or a 5:1 molar ratio of epoxy groups of the liquid epoxy resin to amine groups of the polyether amine. After the system reaches 120° C., allow the reaction to proceed for three more hours with stirring under the nitrogen environment. At the end of three hours, cool the contents to 80° C. before dispensing into a glass storage container. The contents of the flask at the end of the procedure is the TghAgt.

FIG. 1 shows the viscosity of the TghAgt and the CTBN adduct (FORTEGRA™ 201) as measured over a temperature range that covers the relevant range for formulators, i.e. where epoxy curing is expected to be very slow or limited so as to allow sufficiently long open time. The data points in FIG. 1 were viscosity measurements at isothermal 'hold' points. As shown in FIG. 1, the TghAgt is clearly much less viscosity than the CTBN adduct, which is highly advantageous in terms of materials handling, as the CTBN adduct can be difficult to use even at elevated temperatures of around 50° C. At room temperature (e.g., 23° C.), the viscosity is almost one decade lower for the TghAgt, and at higher temperatures, the difference is smaller but still substantial. Thought another way, the TghAgt can be used at temperatures 15-20° C. lower than the CTBN adduct to achieve the same viscosity level. This is considered to be a handling advantage for formulators.

Epoxy Composition Examples 1 and 2 (EC Ex 1 and EC Ex 2), Comparative Example A (CE A) and Control Table 1 shows the formulation used for each of EC Ex 1, EC Ex 2, CE A and a Control. In each case, the component mass was scaled so that the total formulation weight became 310 grams. A stoichiometric ratio between epoxy to amine of 1.05 was used. Mix the materials in the proportions stated in Table 1 at 50° C. in a plastic container sealable with a twist cap, and allow to mix on a dual-axis Flacktek Speed-Mixer at 2000 rotations per minute (rpm) for 2 minutes (min), and then 2350 rpm for 2 min. Remove air bubbles by centrifugation at 2500 rpm for 3 min. Use a 12 inch (in)×12 in×⅛ in vertical steel mold to prepare the epoxy plaques, taking care to pour the content of the container continuously into the mold so as to avoid formation of air bubbles in the resulting plaque.

EC Ex 1 and EC Ex 2 were optically clear upon mixing. The CE A, on the other hand, was optically hazy, even after heating and mixing.

Cure each plaque of the EC Ex 1, EC Ex 2, CE A and Control samples in the same oven under the same curing schedule. The curing schedule was 90° C. for 60 minutes, followed by 180° C. for 180 minutes, after which the oven automatically shut down and allowed to cool down slowly overnight to room temperature (23° C.). The curing schedule was determined based on the approximate onset temperature for the exothermic release of the EC Ex 1 and EC Ex 2, which was measured by DSC as discussed above, and the final cure temperature of 180° C. was based on the $T_g$ of EC Ex 1 and EC Ex 2 being about 160° C.

TABLE 1

| Epoxy Equivalent Weight | Components: | Sample Name | | | |
|---|---|---|---|---|---|
| | | Control | EC Ex 1 (10 wt % TghAgt) | EC Ex 2 (5 wt % TghAgt) | CE A (10 wt % FORTEGRA 201) |
| 42.6 | IPDA (g) | 22.5 | 21.1 | 21.8 | 21.5 |
| 180 | DER 383 (g) | 100 | 90 | 95 | 90 |
| 463 | TghAgt (g) | | 10 | 5 | |
| 340 | FORTEGRA 201 | | | | 10 |
| | stoichiometric ratio (epoxy:amine) | 1.05 | 1.05 | 1.05 | 1.05 |

Glass transition Temperature ($T_g$) and optical clarity information for the plaques is shown in Table 2, and mechanical properties are shown in Table 3. For $T_g$ using DMTA, the test was in torsion mode, with heating at 3° C./min, whereas using differential scanning calorimeter (DSC), the heating rate was 10° C./min. For the $K_{1c}$ fracture toughness measurement, the single-edge notch bend (SENB) method was used (3-inch long, ½ inch wide, ⅛ inch thick test piece with ⅛ inch notch in the thickness-width plane) according to ASTM D5045, with head speed of 0.02 in/min. For Tensile modulus, test specimen length was 6.5 inches, and tested according to ASTM D638.

Measurement of plaque $T_g$ values was done with both DMTA and DSC. As shown in Table 2, the Tg of the plaques of EC Ex 1 and EC Ex 2 does not change from the Control appreciably more than the CE A plaque. In addition, the $K_{1c}$ fracture toughness is measurably higher than the Control plaque for all three plaques EC Ex 1, EC Ex 2 and CE A. The EC Ex 1 plaque has the highest fracture toughness value of the three toughened plaques (EC Ex 1, EC Ex 2 and CE A). So at the same loading, the TghAgt can toughen the epoxy plaque more than FORTEGRA 201. Furthermore, at the reduced loading of EC Ex 2, the fracture toughness is equivalent to that of the FORTEGRA 201 plaque (CE A). So the TghAgt can be used at reduced loading and still achieve the same fracture toughness.

As seen in Table 3, the tensile modulus of the EC Ex 2 plaque is approximately equal to the tensile modulus of the CE A plaque. Again, this demonstrates that the TghAgt can be used at lower loading than the FORTEGRA 201 (CE A) and still achieve comparable mechanical property improvements over the Control plaque.

TABLE 2

| | | Control | EC Ex 1 | EC Ex 2 | CE A |
|---|---|---|---|---|---|
| ° C. | Tg (DMTA tan-delta) | 160.3 | 158.4 | 155.6 | 156.1 |
| ° C. | Tg (DSC inflection) | 158.9 | 155.2 | 157.3 | 155.8 |
| | Optical clarity | Clear | Translucent/Opaque | Mostly Clear | Opaque |

TABLE 3

| Units | | Control | EC Ex 1 | EC Ex 2 | CE A |
|---|---|---|---|---|---|
| MPa-m$^{0.5}$ | K1c (mean) | 0.66 | 1.03 | 0.91 | 0.94 |
| | (stdev) | 0.04 | 0.05 | 0.04 | 0.05 |
| | (N) | 5 | 6 | 5 | 5 |

TABLE 3-continued

| Units | | Control | EC Ex 1 | EC Ex 2 | CE A |
|---|---|---|---|---|---|
| MPa | Modulus | 2811 | 2583 | 2746 | 2707 |
| | (stdev) | 24 | 40 | 37 | 22 |
| | (N) | 5 | 4 | 5 | 5 |

Figure 2:
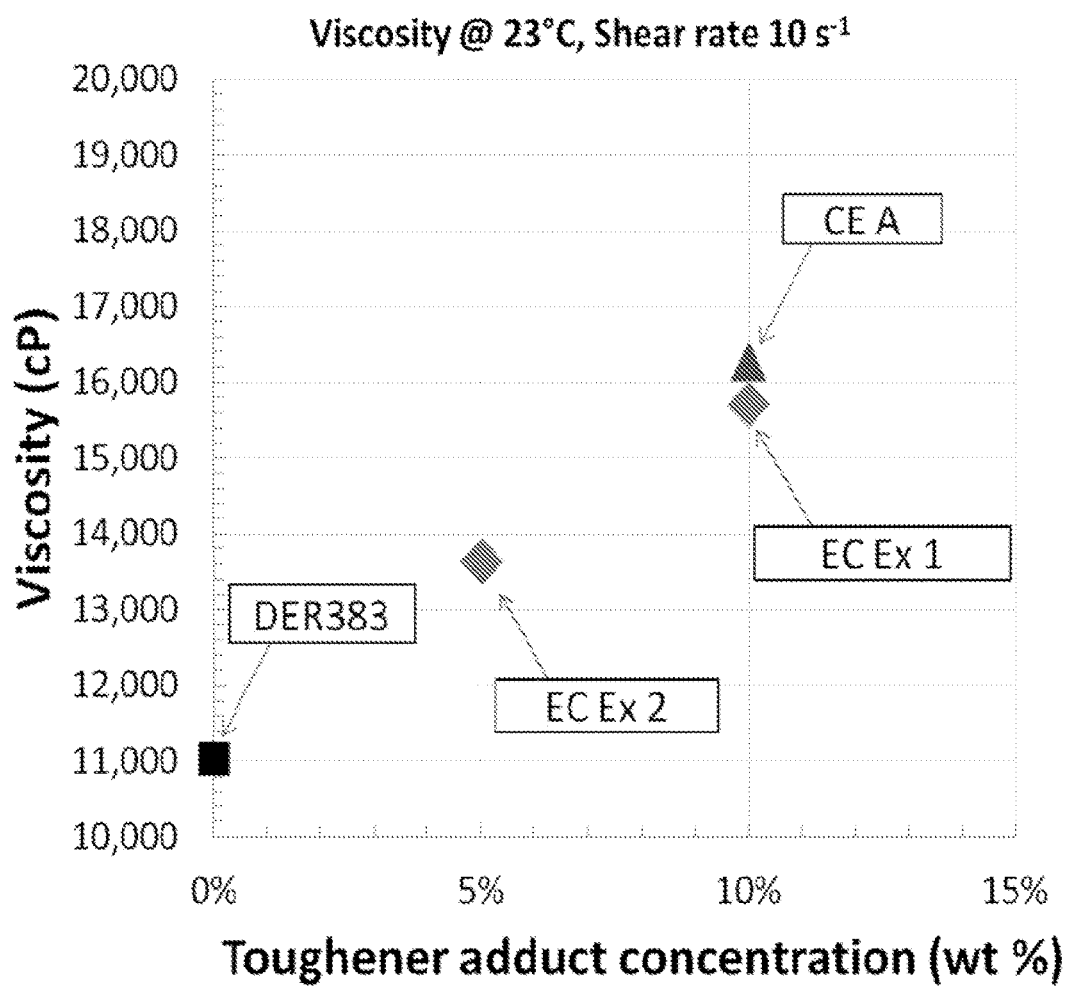
FIG. 2 provides viscosity measurements as a function of weight percent of toughener present for epoxy compositions of the present disclosure, an epoxy resin and a comparative example.

Viscosity measurements of the epoxy compositions (i.e. the formulation without the liquid amine hardener) of Control, CE A, EC Ex 1 and EC Ex 2 are shown in FIG. 2. As illustrated, the viscosity of EC Ex 2 is significantly lower than EC Ex 1. Since the EC Ex 2 and the CE A plaques were of comparable mechanical properties, the use of TghAgt enables the preparation of epoxy plaques with comparable mechanical property with the added advantage that the initial viscosity of EC Ex 2 is significantly lower than the initial viscosity of CE A.

Particle Size

Figures 3A, 3B, 3C, 3D:
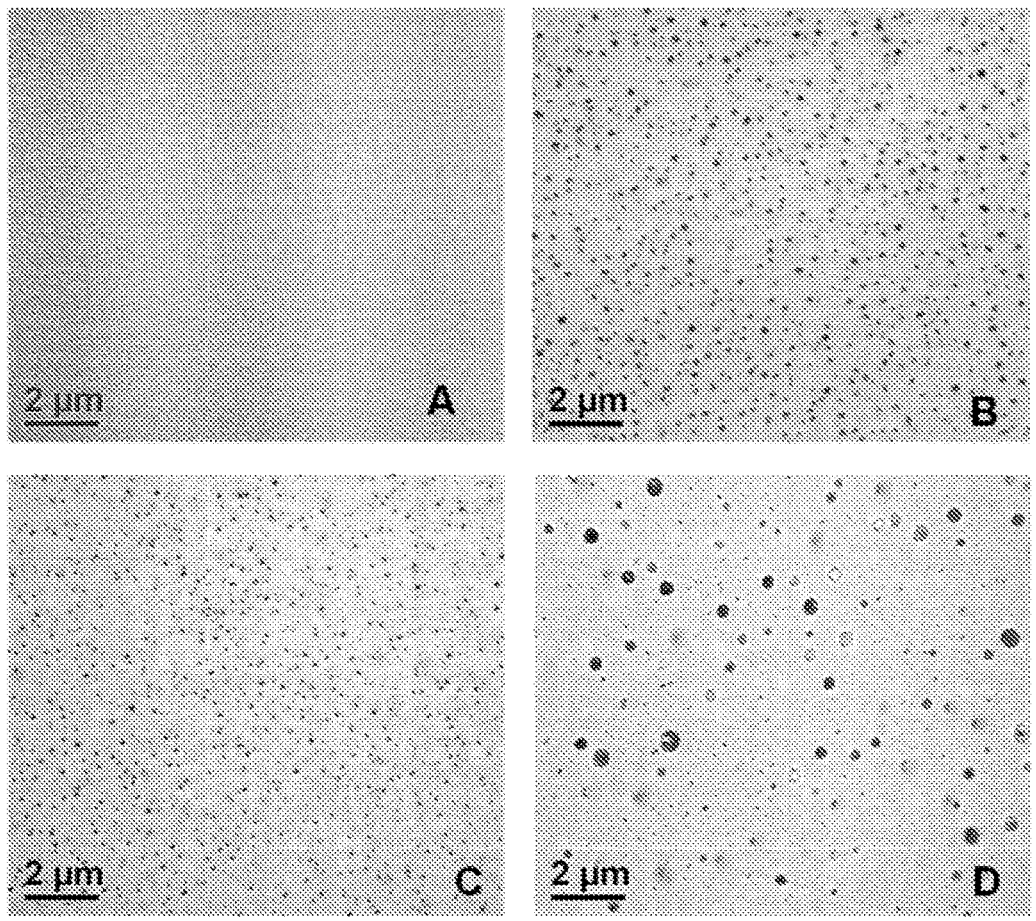
FIGS. 3A-3D provide transmission electron microscopy images of epoxy compositions of the present disclosure (FIGS. 3B and 3C), a comparative example (FIG. 3D) and a control (FIG. 3A).

An effective way to validate the sizes of the particles in the epoxy composition is to examine the domain sizes via transmission electron microscopy (TEM). The micro-morphology of the liquid toughener modified epoxy plaques is shown in TEM images of FIGS. 3B-3D, where FIG. 3A is a TEM image of the Control. FIG. 3B is a TEM image of EC Ex 1, FIG. 3C is a TEM image of EC Ex 2, and FIG. 3D is a TEM image of CE A.

The TEM images show that the particles (stained with $RuO_4$) are dispersed into small domains. The EC Ex 1 and EC Ex 2 (FIGS. 3B and 3C, respectively) plaques have much smaller dispersed particles than the CE A plaque (FIG. 3D). The particles shown in FIGS. 3B and 3C for the EC Ex 1 and EC Ex 2 plaques, respectively, are known to 'dull' the propagating fracture tip and thus requiring more force to continue fracture propagation. So it is expected that having more dispersed particles per volume might be expected to enhance fracture toughness, if such a morphology can be prepared. Such fine dispersions are not known to have been prepared up until this point.

The range of particle sizes seen in the TEM images of FIGS. 3B-3D is summarized in Table 4. There were no domains observed for the Control (FIG. 3A) as expected for a formulation without any toughener, and for which the resulting plaque was optically clear. The CE A plaque had particles having a volume average diameter in a range from 100 nm to 1000 nm, which includes the entire wavelength range of the visible spectrum. In contrast, the EC Ex 1 and EC Ex 2 have a volume average diameter in a range of from 20 nm to 120 nm and from 20 nm to 200 nm, respectively. These two ranges for the volume average diameter are both the wavelength range of the visible spectrum and thus do not significantly impact the optical clarity of the cured epoxy composition. This is consistent with the optical translucency to near transparency of the plaques made with the TghAgt for EC Ex 1 and EC Ex 2.

TABLE 4

| Compositions | Toughener Loading | Particle Size ranges (nm) |
|---|---|---|
| Control | 0 | N/A |
| EC Ex 1 | 10% | 20-200 |
| EC Ex 2 | 5% | 20-120 |
| CE A | 10% | 100-1000 |

While the foregoing is directed to embodiments of the disclosure, other and further embodiments of the disclosure may be devised without departing from the basic scope thereof.

We claim:

1. An epoxy thermoset comprising the reaction product of:
    a toughening agent prepared from a reaction of a first epoxy resin and a polyether polyamine, where the toughening agent is a liquid and the polyether polyamine has a number average molecular weight in a range from 4,500 to 20,000 and includes at least three primary amines each having at least one reactive hydrogen atom reactive with an epoxide group of the first epoxy resin;
    a second epoxy resin, where the second epoxy resin is a liquid; and
    a liquid amine hardener that reacts with both the toughening agent and the second epoxy resin,
        wherein at least a portion of the toughening agent is phase separated into particles formed in the second epoxy resin and the liquid amine hardener at an onset temperature of exotherm for a first time interval and the second epoxy resin and the liquid amine hardener are cured after the first time interval at an curing temperature that is greater than the onset temperature of exotherm,
        wherein the particles have a volume average diameter in a range of from 20 nanometers (nm) to 200 nm.

2. The epoxy thermoset of claim 1, where the first epoxy resin and the second epoxy resin are chemically identical.

3. The epoxy thermoset of claim 1, where during the reaction to prepare the toughening agent the first epoxy resin is in a molar excess relative the polyether polyamine.

4. The epoxy thermoset of claim 1, where the toughening agent is 4 to 30 weight percent of the total weight of the epoxy composition.

5. The epoxy thermoset of claim 1, where the first epoxy resin and the second epoxy resin are each at least one or more of the formula:

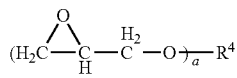

wherein $R^4$ is a C6 to C18 substituted or unsubstituted aromatic, a C1 to C8 aliphatic or cycloaliphatic; or heterocyclic polyvalent group and a has an average value of from 2 to 8.

6. The epoxy thermoset of claim 5 wherein the first epoxy resin and the second epoxy resin are each one or more of a diglycidyl ether of resorcinol, catechol, hydroquinone, bisphenol, bisphenol A, bisphenol AP (1,1-bis(4-hydroxylphenyl)-1-phenyl ethane), bisphenol F, bisphenol K, bisphenol S, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A, or a combination thereof.

7. The epoxy thermoset of claim 1, where the first epoxy resin and the second epoxy resin are each at least one or more of the formula:

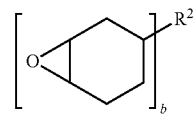

wherein $R^2$ is C6 to C18 substituted or unsubstituted aromatic, a C1 to C8 aliphatic, or cycloaliphatic; or heterocyclic polyvalent group and b has an average value of from 2 to 8.

8. The epoxy thermoset of claim 1, where the liquid amine hardener is isophorone diamine and the first epoxy resin and the second epoxy resin are each a bisphenol A diglycidyl ether.

9. A structure, comprising:
    a surface; and
    an epoxy thermoset of claim 1 on the surface of the structure.

10. A method of curing an epoxy thermoset, comprising:
    supplying a toughening agent prepared from a reaction of a first epoxy resin and a polyether polyamine, where the toughening agent is a liquid and the polyether polyamine has a number average molecular weight in a range from 4,500 to 20,000 and includes at least three primary amines each having at least one reactive hydrogen atom reactive with an epoxide group of the first epoxy resin;
    mixing the toughening agent with a second epoxy resin and a liquid amine hardener, where the second epoxy resin is a liquid;
    phase separating at least a portion of the toughening agent into particles having a volume average diameter in a range from 20 nm to 200 nm in the second epoxy resin and the liquid amine hardener, where phase separating at least a portion of the toughening agent into particles includes allowing the particles to form in the second epoxy resin and the liquid amine hardener at an onset temperature of exotherm for a first time interval; and
    curing the second epoxy resin and the liquid amine hardener, where the particles form a soft dispersed phase and the second epoxy resin and the liquid amine hardener form a hard continuous phase, relative the soft dispersed phase, of the epoxy thermoset, where curing the second epoxy resin and the liquid amine hardener includes increasing the onset temperature of exotherm second to a curing temperature after the first time interval.

* * * * *